(12) United States Patent
Singh et al.

(10) Patent No.: US 8,496,365 B2
(45) Date of Patent: *Jul. 30, 2013

(54) ARTICULATING LAMP ASSEMBLY FOR A VEHICLE

(75) Inventors: Sarbjit Singh, Canton, MI (US); Edward R. Golden, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

This patent is subject to a terminal disclaimer.

(21) Appl. No.: 12/962,836

(22) Filed: Dec. 8, 2010

(65) Prior Publication Data

US 2012/0147616 A1    Jun. 14, 2012

(51) Int. Cl.
*B60Q 1/05* (2006.01)
*F21S 8/10* (2006.01)

(52) U.S. Cl.
USPC ............ 362/527; 362/544; 362/545; 362/546

(58) Field of Classification Search
USPC ................. 362/507, 526, 527, 545, 543, 544, 362/546
See application file for complete search history.

(56) References Cited

U.S. PATENT DOCUMENTS

| | | | |
|---|---|---|---|
| 4,644,448 A * | 2/1987 | Heiler | 362/527 |
| 4,739,223 A | 4/1988 | Baba et al. | |
| 4,943,895 A | 7/1990 | Brandenburg | |
| 6,799,874 B2 | 10/2004 | Nakata | |
| 6,953,274 B2 * | 10/2005 | Rice | 362/526 |
| 7,699,514 B2 | 4/2010 | Shimada | |
| 7,708,439 B2 | 5/2010 | Naganawa et al. | |
| 7,758,218 B2 * | 7/2010 | Mochizuki et al. | 362/465 |
| 7,775,695 B1 | 8/2010 | Rose | |
| 7,784,985 B2 | 8/2010 | Meyrenaud | |
| 2004/0100803 A1 | 5/2004 | Steward | |
| 2005/0036326 A1 | 2/2005 | Van Duyn | |
| 2008/0115414 A1 | 5/2008 | Hogan | |
| 2008/0253143 A1 | 10/2008 | Blandin et al. | |
| 2012/0147615 A1 * | 6/2012 | Singh et al. | 362/507 |

OTHER PUBLICATIONS

Fujita, Takeshinge; Ichihara, Takeo; and Oyama, Hiroo, Development of MR (Multi Reflector) Headlamp (Headlamp with Slant Angle of 60 Degrees, Contributable to Future Vehicle Body Styling), SAE International Paper No. 870064, published Feb. 1, 1987, 1 page.

* cited by examiner

*Primary Examiner* — Alan Cariaso
(74) *Attorney, Agent, or Firm* — Raymond Coppiellie; Price Heneveld LLP

(57) ABSTRACT

A vehicle lighting assembly is provided which includes a housing, first and second light sources located in the housing, and an articulating lighting device. The articulating lighting device is located within the housing and moves between a use position in front of another light source to provide light and a retracted position. Accordingly, light assembly housing is effectively used to provide a secondary light source, such as a daylight running lamp.

20 Claims, 3 Drawing Sheets

ARTICULATING LAMP ASSEMBLY FOR A VEHICLE

FIELD OF THE INVENTION

The present invention generally relates to vehicle lighting, and more particularly relates to articulating lighting assemblies for vehicles.

BACKGROUND OF THE INVENTION

Automotive vehicles are generally designed with aerodynamic shaped bodies which often result in large plan view angles and large side view rake angles for the body surfaces. These angles generally compound to reduce the effect of frontal surfaces available for the packaging of content on vehicle headlamps and tail lamps. The severe rake angle of the headlamp and the tail lamp surfaces as seen in the side view typically creates a large shelf of unused space in front of the functional reflector and lighting elements.

Some vehicles have motor actuated flip up headlamp assemblies that flip up or rotate to provide the lighting function. The entire flip up headlamp typically includes multiple lighting devices located within a sealed housing to accommodate various lighting needs. When not in use, the flip up headlamp assembly may be rotated down so that it rests flush with the vehicle body surface to provide an aerodynamic shaped surface for the vehicle. Conventional flip up lighting assemblies generally may be susceptible to failure.

SUMMARY OF THE INVENTION

According to one aspect of the present invention, a vehicle lighting assembly is provided. The lighting assembly includes a housing, a first lighting device located in the housing, and a second lighting device located within the housing. The lighting assembly also includes an articulating mechanism for moving the second lighting device relative to the first lighting device such that the second lighting device moves in front of the first lighting device in a use position and is retracted in a non-use position.

According to another aspect of the present invention, a vehicle lighting assembly is provided that includes a housing having a lighting window and a lighting device disposed in the housing. The lighting assembly also includes an articulating mechanism for moving the lighting device within the housing between a use position within the lighting window and a retracted position stowed outside of the lighting window.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
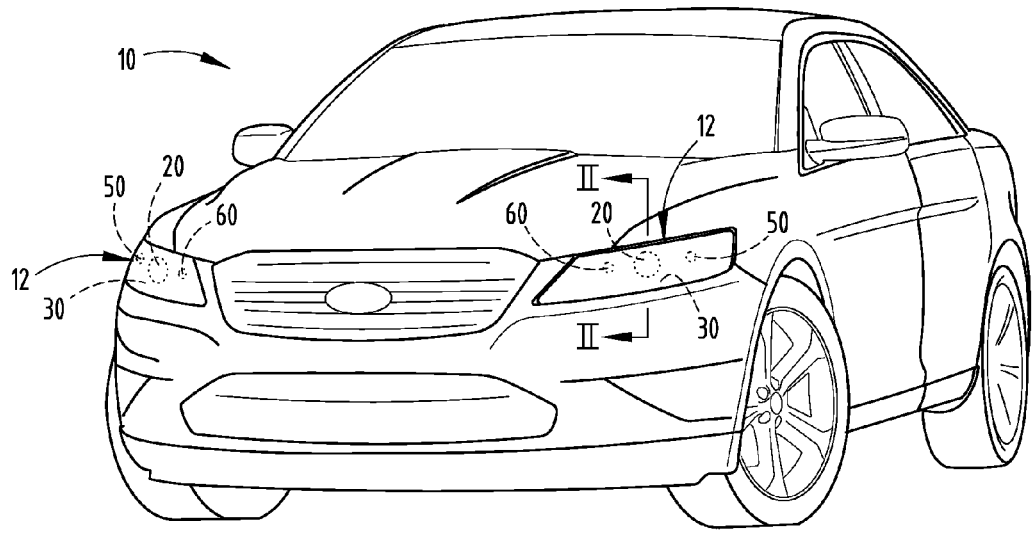
FIG. 1 is a front perspective view of a vehicle having a pair of front headlamp lighting assemblies employing an articulating light source, according to one embodiment.
Figure 2:
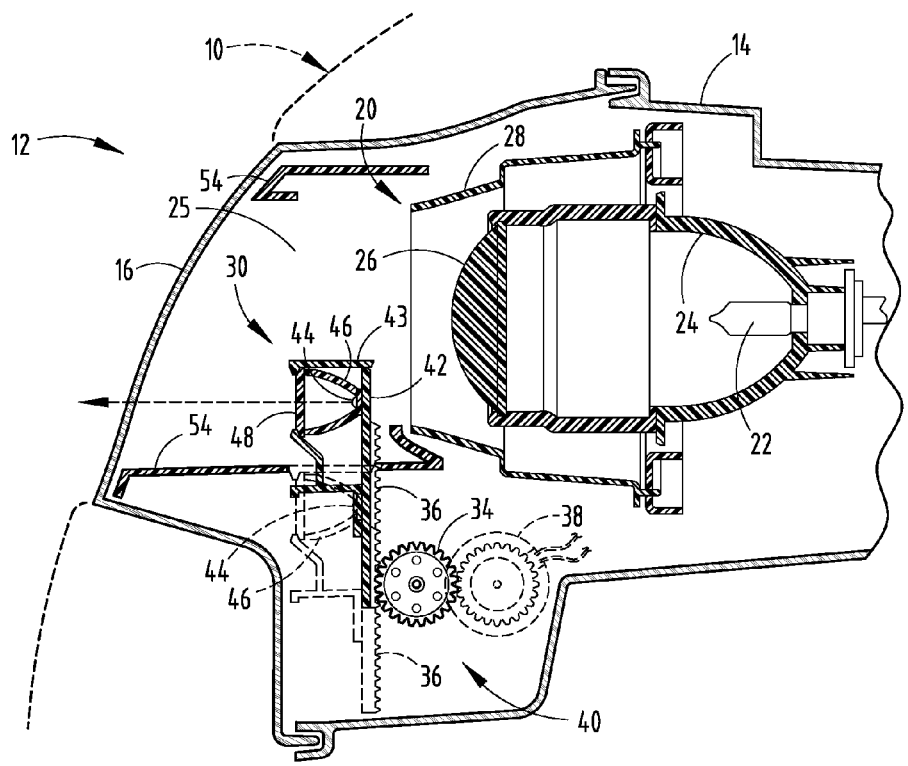
FIG. 2 is an enlarged cross-sectional view taken through II-II of FIG. 1 further illustrating the lighting assembly.

For purposes of description herein, the terms "upper," "lower," "right," "left," "rear," "front," "vertical," "horizontal," and derivatives thereof shall relate to the vehicle 10 and the lighting assembly 12 as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, an automotive wheeled vehicle 10 is generally illustrated having a pair of lighting assemblies 12 shown generally located at left and right front sides of the vehicle 10, according to one embodiment. The lighting assemblies 12 provide headlamp lighting and other exterior lighting for the vehicle 10 generally forward of the vehicle 10. Each lighting assembly 12 is shown having a first lighting device 20 with a first light source serving as a headlamp which may provide a low beam headlamp or headlight, according to one embodiment. According to another embodiment, first lighting device 20 may provide both high and low beam headlamps as is generally known in the vehicle lighting art. Each lighting assembly 12 also has a second lighting device 30 with an articulating second light source located generally forward of the first lighting device 20. According to one embodiment, the second lighting device 30 serves as a daylight running lamp (DRL) or daylight running light.

Additionally, each lighting assembly 12 is further shown including a turn signal lamp 50 and a high beam headlamp 60. The high beam headlamp 60 is operable for use with the low beam headlamp 20 to provide increased light illumination, according to one embodiment. It should be appreciated that other combinations of lighting devices may be employed with the second lighting device 30 and lighting assembly 12. Each lighting assembly 12 generally includes a sealed housing which contains the various lighting devices as explained herein.

Figure 3:
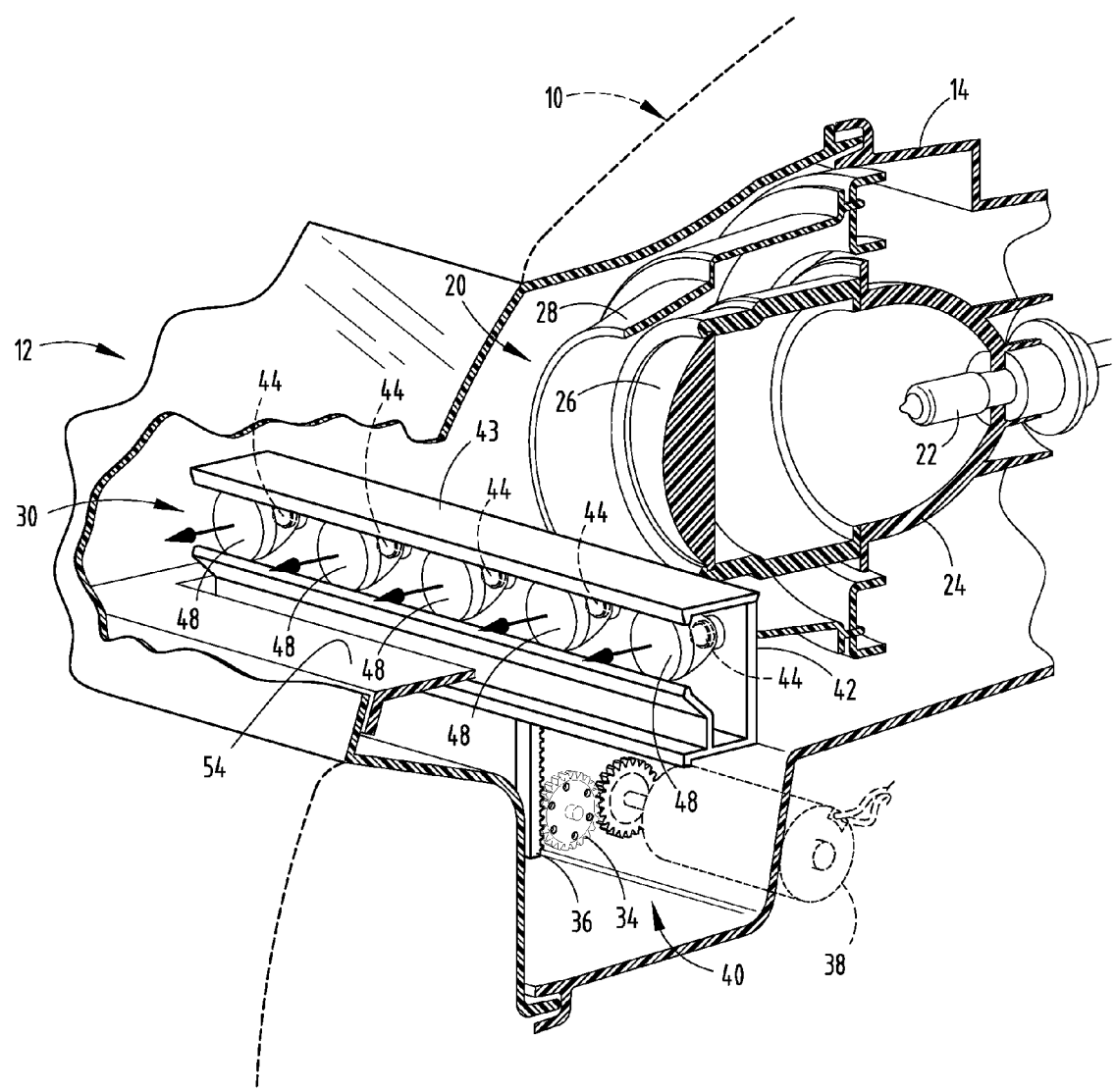
FIG. 3 is a perspective cross-sectional view further illustrating the lighting assembly with the articulating light source in the upward use position.
Figure 4:
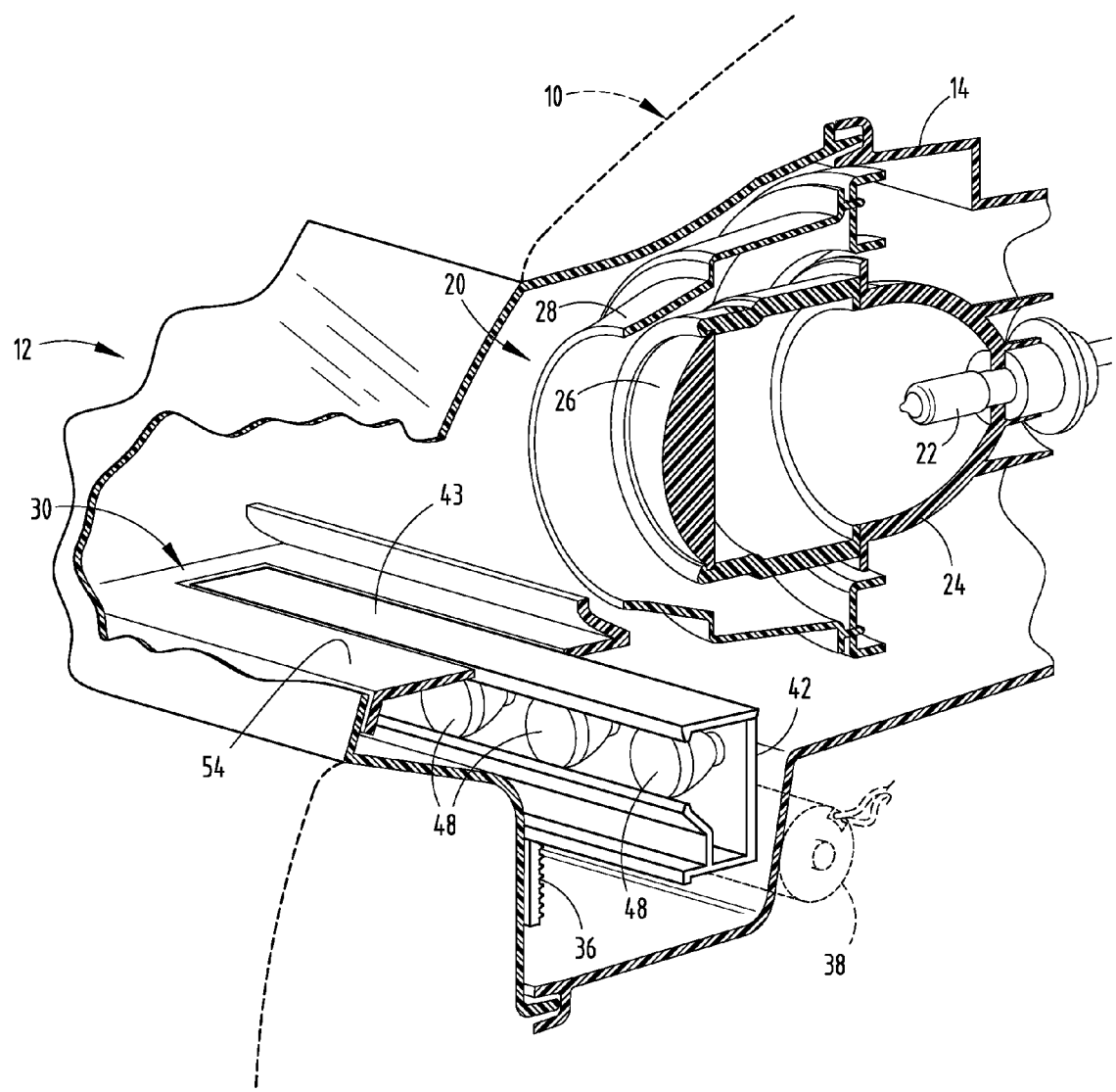
FIG. 4 is a perspective cross-sectional view of the lighting assembly further illustrating the articulating light source in the downward retracted position.

Referring to FIGS. 2-4, the lighting assembly 12 is illustrated having a housing generally made-up of a front housing member 16 and a rear housing member 14. The front housing member 16 has a clear transparent optical lens that allows light to pass therethrough. The front housing member 16 has an aerodynamic and aesthetically pleasing design that is installed into and conforms with the vehicle body. The front housing member 16 is sealed to the rear housing member 14 to provide a sealed housing enclosure that contains various lighting devices and associated components therein. In the embodiment shown, the headlamp 20 generally includes a light source 22, such as a halogen bulb or High Intensity Discharge (HID) bulb, located at the center of a reflector 24 and further has an optical lens 26 which may be assembled in front of the bulb 22 to form a sealed lighting device. The headlamp 20 is generally oriented forward to direct light emitted therefrom through the lighting window 25 and the lens of front housing member 16 to provide lighting in a beam generally forward of the vehicle 10. A projector ring 28 surrounds the outer wall of lens 26 and extends forward thereof. A bezel 54 is provided substantially within the front housing member 16 and generally surrounds the lighting window 25 through which light passes through the lens of the front housing member 16. When the headlamp 20 is turned on, the headlamp 20 provides light illumination that passes through the lighting window 25 inside bezel 54 and through the lens of front housing member 16 such that the light projects in a beam generally forward of the vehicle 10.

The second lighting device 20 of lighting assembly 12 includes one or more light sources 44 shown and described herein as light emitting diodes (LEDs) mounted onto a support structure 42, such as a circuit board. The supporting circuit board 42 is shown positioned upright and having a horizontal flat sheet 43 provided on top thereof. In the embodiment shown, six LEDs 44 are employed on circuit board 42. Each LED 44 is mounted to circuit board 42 which, in turn, has electrical circuitry that supplies electrical power to power the LEDs 44. Each LED 44 has a parabolic reflector 46 extending from the LED 44 at one end and an optical lens 48 assembled to an opposite end of the reflector 46. Accordingly, the LED 44, reflector 46 and lens 48 may provide for a sealed lighting device assembly for generating light illumination from the LED 44 through the optical lens 48 and the lighting window 25. It should further be appreciated that the second lighting device 30 may include additional components including electronics, such as electrical wiring and circuit traces for supplying electrical power to the light source 44. The second lighting device 30 is actuatable by an actuator 40 to move between a use position within the lighting window 25 in front of the first light source 20 to reflect light from the second light sources 44 generally forward as shown in FIGS. 2 and 3 and a retracted or stowed position below the bezel 54 and outside the lighting window 55 as shown in FIG. 4.

The articulating lighting device 30 moves the light sources 44 and associated components including the reflectors 46 and lenses 48 up and down together relative to the first light source 20 between the use and stowed positions. The reflectors 46 may have various shapes and sizes. In one embodiment, the reflector 46 may be eliminated such that light is emitted from each LED 44 through lens 48 without the need for a reflector. Each pair of reflector 46 and lens 48 is aligned with a different one of the LEDs 44 to direct light from each corresponding LED 44 through the lighting window 25 and through the lens of the front housing member 16 generally forward of the vehicle 10 when the second lighting device 30 is activated. When activated, the second lighting device 30 is moved to the upward use position in which the second lighting device 30 and its associated components is disposed at least partially in front of the headlamp 20, such that the headlamp 20 is partially blocked and may not be fully usable. Accordingly, in one embodiment, the second lighting device 30 may be deployed upward to provide lighting from the second lighting device 30 when the headlamp 20 is not actuated or used. In one embodiment, the second lighting device 30 serves as a daylight running light (DRL) which provide a secondary LED light source as opposed to employing the headlamp 20. The daylight running light may be useful for providing sufficient daytime lighting when the vehicle headlamps 20 are not needed. The second lighting device 30 utilizes the articulating lighting device in a manner that effectively employs the space forward of the headlamp 20 within the housing formed by the front and rear housing members 16 and 14.

The second lighting device 30 is shown having six LEDs 42 and six corresponding reflectors 46 and lenses 48, according to one embodiment. The number of LEDs 42 and the number of associated related components, such as the reflectors 46 and lens 48 may vary depending on the amount of light desired, the intensity of the lighting devices 44, and the desired beam pattern. The shape of the individual reflectors 46 and lenses 48 may vary depending on the shape of the output light beam desired. It should be appreciated that more than one light sources 44 may be employed in the second lighting device 30. It should further be appreciated that multiple light sources 44 may direct light through a single optical lens 48 and may employ a single reflector, if desired.

The articulating lighting device 30 includes an actuator 40 for actuating the second lighting device 30 vertically between upward use and downward stowed positions as shown in FIGS. 2-4. The actuator 40 includes a motorized gear and rack drive including an electric motor 38, a gear 34 and a rack 36, according to one embodiment. The motor 38 has a toothed output shaft which engages gear 34 which causes the rack 36 and the supporting circuit board 42 and lighting components connected thereto to move vertically upward above bezel 54 into the lighting window 25 as shown in FIGS. 2 and 3, and downward to a position flush with or below bezel 54 outside of the lighting window 25 as shown in FIG. 4. When actuated to the upward use position, the lighting device 30 exposes an opening in the bezel 54 through which the supporting circuit board 42 and various components connected thereto extend. In the stowed position, the top plate 33 of the supporting substrate 42 serves as a cover to close the opening formed in the bezel 54.

The articulating lighting device 30 moves up and down with light sources 44 and associated electronics including wires, circuit traces, and circuit board 42. The housing 16, 14 remains fixed on the vehicle 10 such that it does not articulate. The actuator 40 and the various other components of the second lighting device 30 remain completely sealed within the housing such that quality issues associated with conventional assemblies having articulating elements exposed to the environment are minimized. It should be appreciated that the actuator 40 may employ other actuation devices, such as solenoids, vacuums, electrical or hydraulic actuators, according to other embodiments. Additionally, it should be appreciated that the actuator 40 may move the second lighting device 30 linearly or provide a rotational movement to position the second lighting device 30 with respect to the housing 16, 14 and first lighting device 20, according to further embodiments.

While the second lighting device 30 is shown and described herein has an articulating assembly of LEDs 44, reflectors 46, and lenses 48 supported on a circuit board 42, it should be appreciated that other articulating assemblies having one or more components of the second lighting device 30 that articulate in response to actuator 40 may be employed. It is further conceivable that the articulating mechanism shown and described herein as the second lighting device 30 may include other additional components that move with the articulation mechanism. U.S. patent application Ser. No. 12/962,815, filed on the same date, and assigned to the Assignee of the present application discloses a lighting assembly having an articulating reflector actuated by an actuation mechanism and is hereby incorporated herein by reference.

Accordingly, the vehicle lighting assembly 12 advantageously provides for a secondary lighting arrangement in which a second lighting device 30 moves relative to first lighting device 20 and housing 16, 14 to provide a secondary source of lighting within the housing 16, 14. The secondary light source 44 may provide daylight running lamps (DRL) that may be operated when the headlamp 26 is turned off. By employing the daylight running lamps within the housing 16 and forward of the headlamp 20, space within the housing 16,14 is effectively utilized to provide the secondary lighting. While the lighting assembly 12 has been shown and described herein in connection with what is generally referred to as a vehicle headlamp assembly, it should be appreciated that the lighting assembly may employ an articulating lighting source or device for use in other lighting devices on the vehicle 10, such as within the taillight assembly according to other embodiments.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle lighting assembly comprising:
    a light housing;
    a first lighting device located in the housing;
    a second lighting device located in the housing; and
    an articulating mechanism for moving the second lighting device relative to the first lighting device such that the second lighting device moves in front of the first lighting device within a lighting window in a use position and is retracted in a non-use position outside the lighting window.

2. The lighting assembly of claim 1, wherein the second lighting device operates as a daytime running lamp.

3. The lighting assembly of claim 1, wherein the second lighting device comprises at least one light emitting diode.

4. The lighting assembly of claim 1, wherein the first lighting device comprises a vehicle headlamp.

5. The lighting assembly of claim 1, wherein the second lighting device comprises a plurality of light emitting diodes.

6. The lighting assembly of claim 1, wherein the second lighting device comprises a supporting board, at least one light emitting diode and an optic lens.

7. The lighting assembly of claim 1, wherein the articulating mechanism comprises a motorized actuator.

8. The lighting assembly of claim 7, wherein the motorized actuator comprises a gear and rack drive.

9. The lighting assembly of claim 1, wherein the articulating mechanism moves the second lighting device to a retracted stowed position below the first lighting device.

10. A vehicle lighting assembly comprising:
    a sealed light housing having a lighting window;
    a headlamp disposed in the housing;
    a lighting device disposed in the housing; and
    an articulating mechanism disposed in the housing for moving the lighting device relative to the headlamp between a use position within the lighting window in front of the headlamp and a retracted position stowed outside of the lighting window.

11. The lighting assembly of claim 10, wherein the articulating mechanism moves the lighting device between a use position at least partially within the lighting window and a retracted position outside of the lighting window.

12. The lighting assembly of claim 10, wherein the lighting device comprises a daylight running lamp.

13. The lighting assembly of claim 12, wherein the lighting device comprises at least one light emitting diode.

14. The lighting assembly of claim 10, wherein the lighting device comprises a plurality of light emitting diodes mounted on a supporting substrate.

15. The lighting assembly of claim 14, wherein the lighting device further comprises a plurality of optical lenses in communication with the plurality of light emitting diodes.

16. The lighting assembly of claim 10, wherein the articulating mechanism comprises a motorized actuator.

17. The lighting assembly of claim 16, wherein the motorized actuator comprises a gear and rack drive.

18. The lighting assembly of claim 10, wherein the headlamp is fixed in the housing.

19. The lighting assembly of claim 1, wherein the first lighting device is fixed in the housing.

20. The lighting assembly of claim 1, wherein the light housing comprises a front housing member sealed to a rear housing member to provide a sealed housing enclosure.

* * * * *